(12) United States Patent
Chang

(10) Patent No.: US 7,409,966 B2
(45) Date of Patent: Aug. 12, 2008

(54) BALL VALVE

(76) Inventor: Hung-Chung Chang, No. 84-3, Wunchang E. 6th St., Beitun District, Taichung City 406 (TW)

( * ) Notice: Subject to any disclaimer, the term of this patent is extended or adjusted under 35 U.S.C. 154(b) by 160 days.

(21) Appl. No.: 11/417,203

(22) Filed: May 4, 2006

(65) Prior Publication Data

US 2007/0256746 A1 Nov. 8, 2007

(51) Int. Cl.
*F16K 11/087* (2006.01)
(52) U.S. Cl. .................. 137/625.47; 251/317
(58) Field of Classification Search ............ 137/625.47; 251/317
See application file for complete search history.

(56) References Cited

U.S. PATENT DOCUMENTS

| | | | | |
|---|---|---|---|---|
| 2,905,197 A | * | 9/1959 | Janes ................ | 137/625.47 |
| 3,236,495 A | * | 2/1966 | Buchholz ............... | 251/315.12 |
| 3,675,895 A | * | 7/1972 | Matousek .............. | 251/315.12 |
| 4,026,516 A | * | 5/1977 | Matousek .............. | 251/315.12 |
| 4,441,524 A | * | 4/1984 | Mese .................... | 137/625.47 |
| 4,685,488 A | * | 8/1987 | Corbin et al. ............... | 137/328 |

* cited by examiner

*Primary Examiner*—John Fox
(74) *Attorney, Agent, or Firm*—Browdy and Niemark

(57) ABSTRACT

A ball valve includes a valve seat having a chamber therein and bores communicated with the chamber, a ball, which has a plurality of channels, received in the chamber, a shaft connected to the ball, and a plurality of lids connected to the valve seat to close the bores. The ball valve further includes two plugs received in the chamber, each of which has a through hole and a concave portion fitting the ball to completely cover the ball therein when the first plug is combined with the second plug, a first recess, two second recesses at opposite sides of the first recess and two slot around the second recesses respectively, wherein the slots form two receiving slots when the first plug is combined with the second plug, and two pads, each of which has a through hole, received in the receiving slots respectively to cover the ball.

12 Claims, 6 Drawing Sheets

BALL VALVE

BACKGROUND OF THE INVENTION

1. Field of the Invention

The present invention relates generally to a ball valve, and more particular to a ball valve with a leakage-proof between the ball and the valve seat. The ball valve of the present invention is easy to assemble also.

2. Description of the Related Art

FIG. 7 shows a conventional multi-way ball valve, which includes a valve seat 100, a ball 200, a shaft 300 and four lids 400. The valve seat 100 has a chamber 101 therein and four bores communicated with the chamber 101. The ball 200, which is received in the chamber 101 of the valve seat 100, has two channels 201. The shaft 300 is inserted into the bore of the valve seat 100 and connected to the ball 200. The shaft 300 is turned to rotate the ball 200 to change the orientations of the channels 201. The lids 400 are fixed to the valve seat 100 to close the bores respectively, each of which has a pad 401 at an interior side thereof for leakage-proof.

The pads 401 of the lids 400 are pressed on valve seat 100 rather than the ball 200, such that there is a residual space 102 in the valve seat 100. Fluid flowing through the ball valve will flow into the residual space 102 when the ball 200 is turned. If the fluid is a putrescible fluid, the fluid received in the residual space 102 will be putrefied after a long time of use, and the putrefactive fluid may be mixed with the flesh fluid and flow out that will cause pollution of the fluid.

An improved ball valve provides the lids with a concave portion at the interior side to fit the ball. This kind of lid is provided with two inclined face at opposite sides of the concave portion that make the ball valve is hard to assemble. Furthermore, it breaks the leakage-proof also.

SUMMARY OF THE INVENTION

The primary objective of the present invention is to provide a ball valve, which may prevent the fluid received in the valve seat.

The secondary objective of the present invention is to provide a ball valve, which is easy to assemble.

According to the objective of the present invention, a ball valve includes a valve seat having a chamber therein and bores communicated with the chamber, a ball, which has a plurality of channels, received in the chamber, a shaft connected to the ball, and a plurality of lids connected to the valve seat to close the bores. The ball valve further includes two plugs received in the chamber, each of which has a through hole and a concave portion fitting the ball to completely cover the ball therein when the first plug is combined with the second plug, a first recess, two second recesses at opposite sides of the first recess and two slots around the second recesses respectively, wherein the slots form two receiving slots when the first plug is combined with the second plug, and two pads, each of which has a through hole, received in the receiving slots respectively to cover the ball.

DETAILED DESCRIPTION OF THE INVENTION

Figure 1:
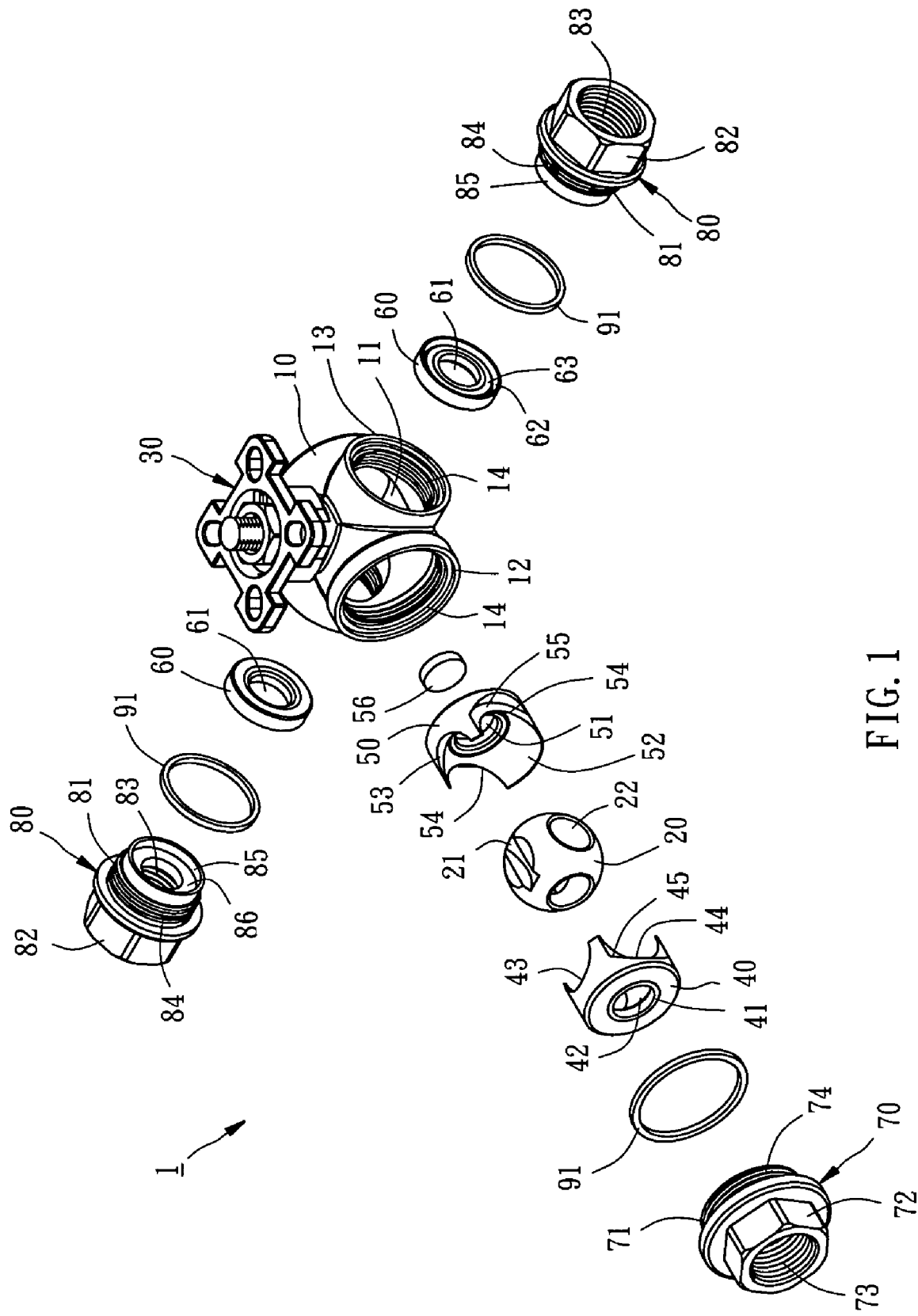
FIG. 1 is an exploded view of a preferred embodiment of the present invention.
Figure 2:
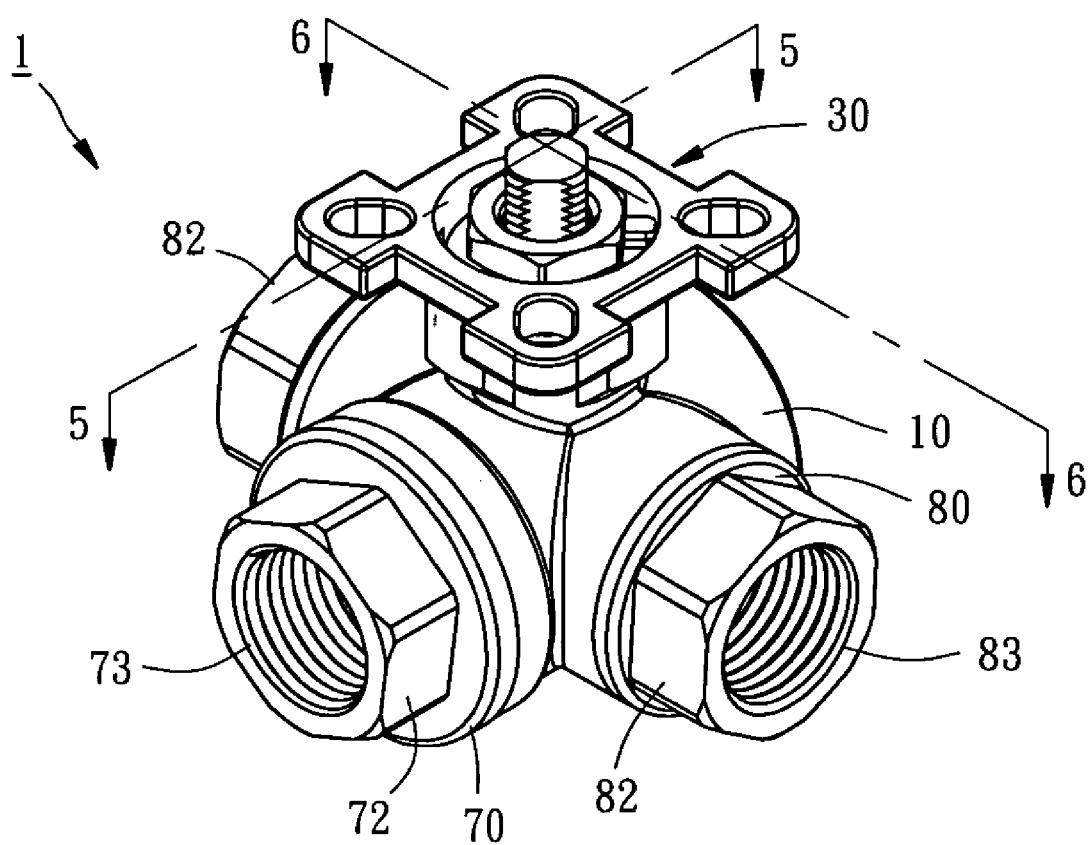
FIG. 2 is a perspective view of the preferred embodiment of the present invention.
Figure 3:
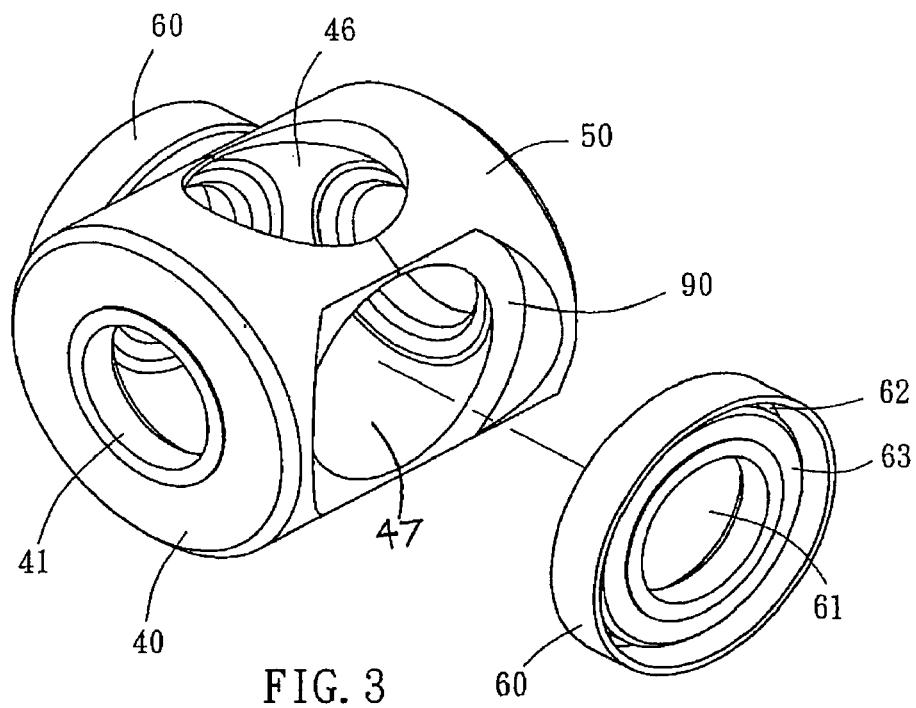
FIG. 3 is an exploded view of the plug and the pad of the preferred embodiment of the present invention.
Figure 4:
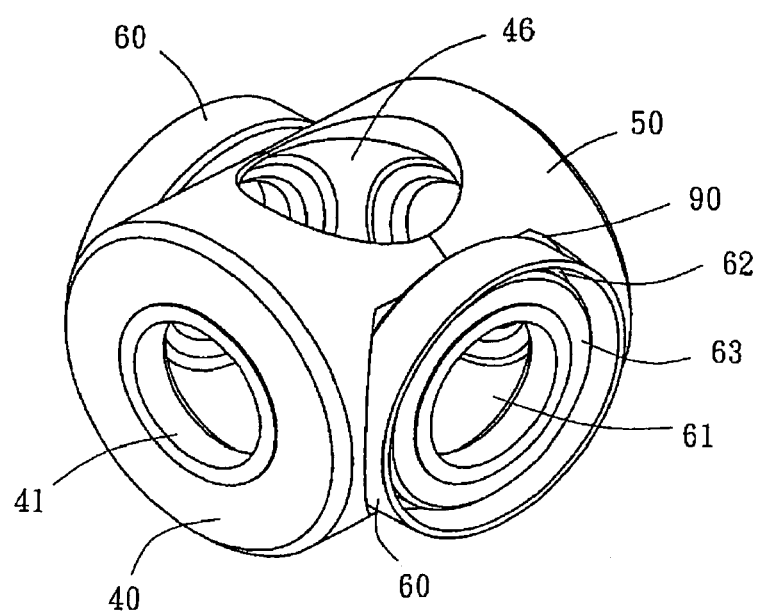
FIG. 4 is a perspective view of the combination of the plug and the pad of the preferred embodiment of the present invention.
Figure 5:
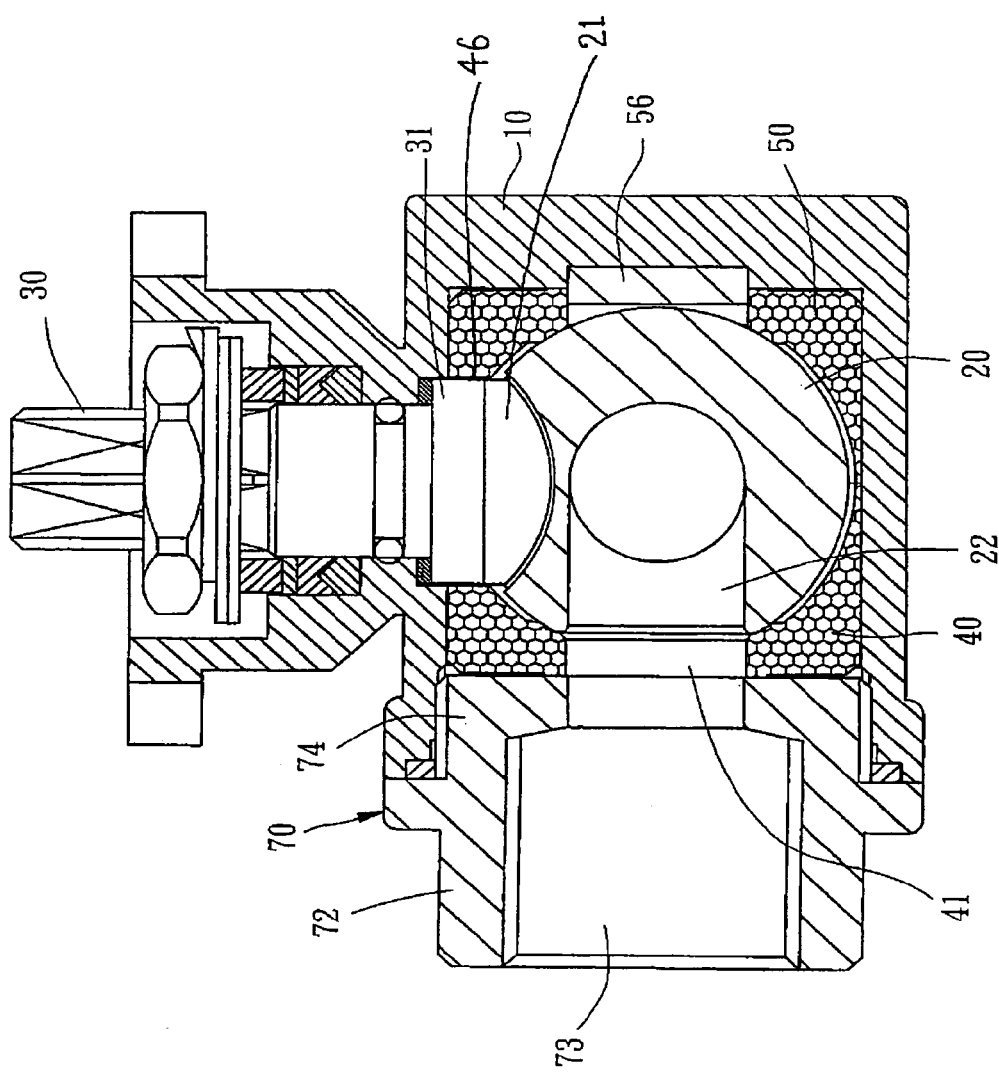
FIG. 5 is a sectional view along 5-5 line of FIG. 2.
Figure 6:
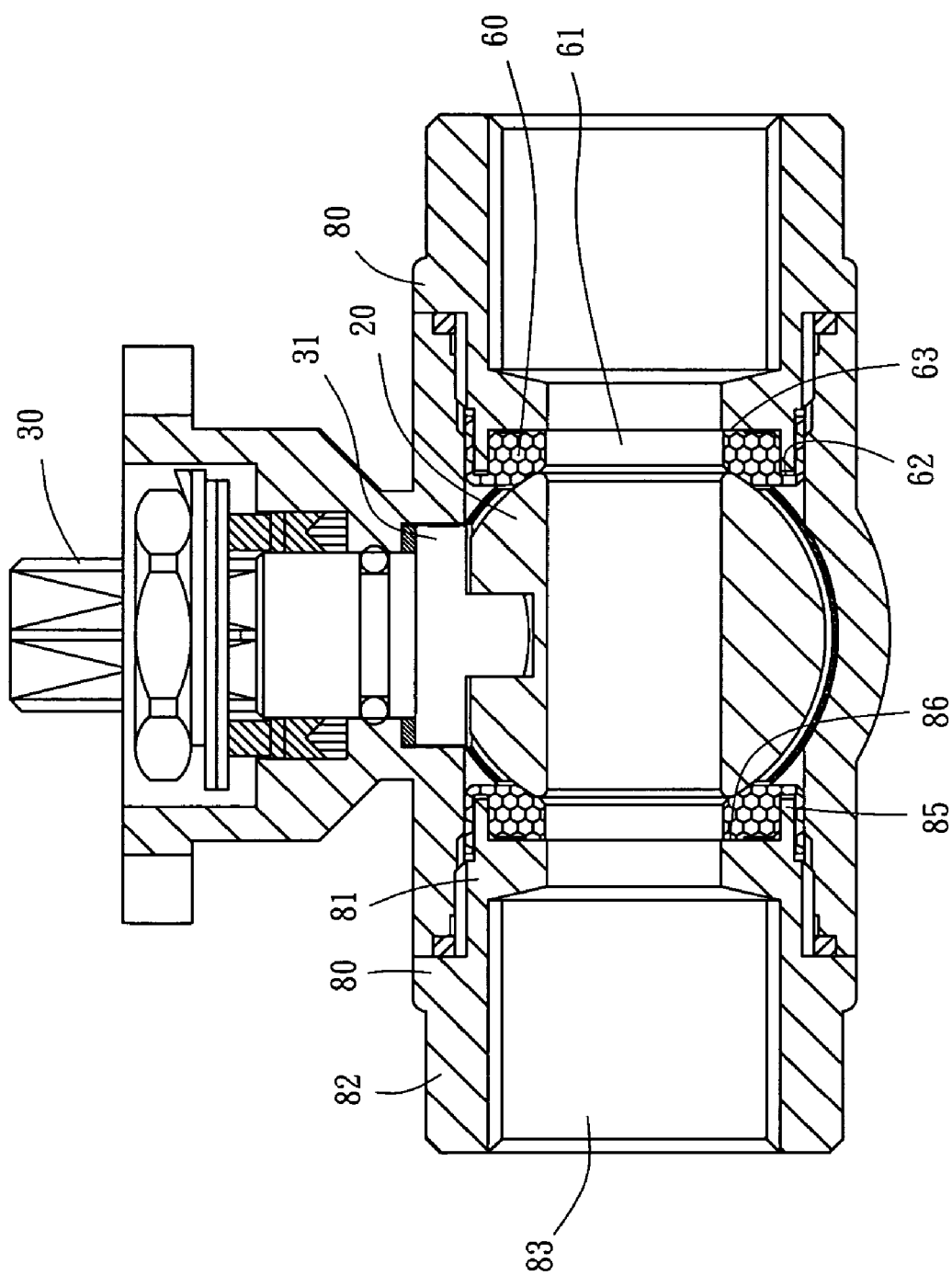
FIG. 6 is a sectional view along 6-6 line of FIG. 2.
Figure 7:
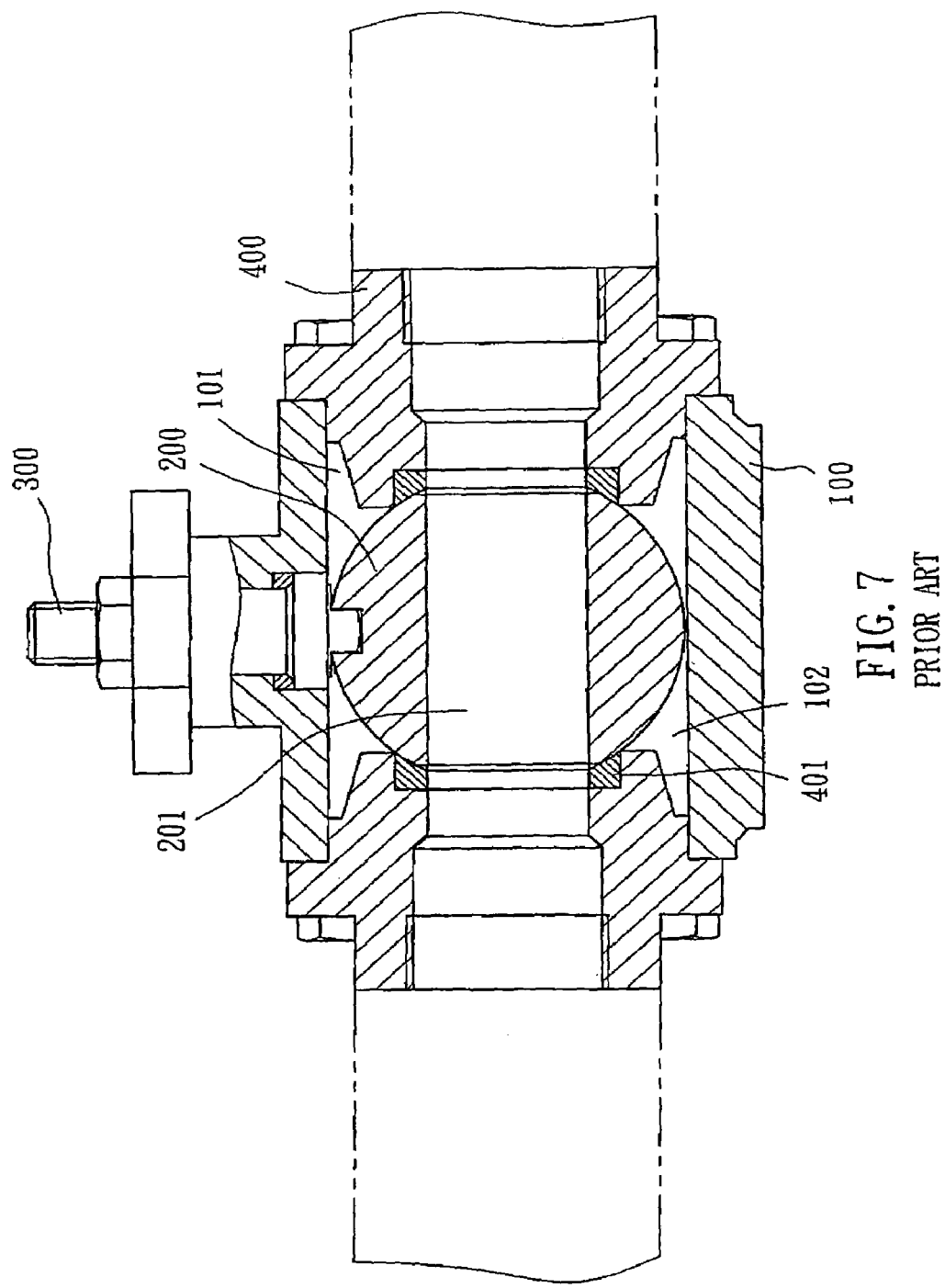
FIG. 7 is a sectional view of the conventional ball valve.

As shown in FIG. 1 to FIG. 6, a ball valve 1 of the preferred embodiment of the present invention includes a valve seat 10, a ball 20, a shaft 30, a first plug 40, a second plug 50, two pads 60, a first lid 70 and two second lids 80. The valve seat 10 has a chamber 11 therein, a first bore 12 and two second bores 13 communicated with the chamber 11. The valve seat 10 further has an inner threaded section 14 on sidewalls of the first and second bores 12 and 13 respectively.

The ball 20 is received in the chamber 11 of the valve seat 10 and has a recess 21 and three channels 22. The shaft 30 is inserted into the valve seat 10 from a top thereof, and has a block 31 at an end thereof to be engaged with the recess 21 of the ball 20, such that the shaft 30 nay turn the ball 20.

Each of the plug 40 and 50 has a through hole 41 and 51 at an end thereof and a concave portion 42 and 52 at opposite end. The concave portions 42 and 52 may be combined as a ball chamber to receive the ball 20 therein without any gap therebetween. Each of the plug 40 and 50 further has a semicircular first recess 43 and 53, two semicircular second recesses 44 and 54 at opposite sides of the first recesses 43 and 53 respectively and two semi-annular slots 45 and 55 around the second recesses 44 and 54 respectively. The second plug 50 further has a lid 56 to close the through hole 51. The first recesses 43 and 53 form a round bore when the first plug 40 is combined with the second plug 50 to pass the block 31 of the shaft 30 therethrough. The second recesses 44 and 54 form a guiding bore 47 (FIG. 3), which is communicated with the channel 22 in ball 20, when the first plug 40 is combined with the second plug 50. In addition, the slots 45 and 55 form two round receiving slots 90 to receive the pads 60 therein.

The pads 60 are two round members with ends pressed on the plugs 40 and 50. Each of the pads 60 has a through hole 61 and an annular slot 62 at an end thereof. It forms a flange 63 between the through hole 61 and the slot 62.

The first lid 70 has a connection portion 11 at an end thereof and a fit portion 72 at an opposite end. Each of the second lids 80 has a stair-like connection portion 81 and neck portion 85 at an end thereof and a fit portion 22 at an opposite end. Each of the lids 70 and 80 has a central bore 73 and 83 and is fitted with a ring 91 at the connection portion 71 and 81 respectively. Each of the lids 70 and 80 has an outer threaded section 74 and 84 on an exterior side of the connection portion 71 and 81 to be meshed with the inner threaded sections 14 of the valve seat 10 respectively. The neck portion 85 has an annular step 86, which has a diameter greater than that of the flange 63 of the pad 60 and the neck portion.85. The fit portions 72 and 82 connect tubes respectively.

As shown in FIG. 2 to FIG. 6, the ball valve 1 of the present invention provides the first and second plugs 40 and 50 covers the ball 20, and the plugs 40 and 50 and the ball 20 are received in the chamber 11 of the valve seat 10. The second plug 50 is located at an interior side of the chanter 11 with the lid 56 closing the through hole 51. The first plug 40 is associated with the first bore 12 of the valve seat 10. The guiding bore 47 formed by the second recesses 44 and 54 are associated with the second bores 13 respectively. The block 31 of the shaft 30 is engaged with the recess 21 of the ball 20. The pads 60 are put in the chanter 11 via the second bores 13 and received in the receiving slots 90 respectively such that the plugs 40 and 50 cover the ball 20 therein. The first lid 70 and the second lids 80 are screwed onto the valve seat 11 to close the first bore 12 and the second bores 13. The connection portion of the first lid 70 presses the first plug 40, and the neck portions 85 of the second lids 80 is received in the annular slots 62 of the pads 60 respectively to press the pads 60 on the plugs 40 and 50. The shaft 30 is turned to rotate the ball 20 to change the orientations of the channels 22.

The characters of the present invention are listed hereunder:

1. The first and second plugs 40 and 50 are provided with the annular slots 45 to form the round receiving slots 90 when the first plug 40 is combined with the second plug 50 that the pads 60 are received in the round receiving slots 90 respectively to help the assembling process.

2. The neck portions 85 of the second lids 80 are received in the annular slots 62 of the pads 60, and the annular steps 86 are fitted to the flanges 63 that force the pads 60 and the plugs 40 and 50 with a tight fitness.

3. According to the first and second descriptions, each of the pads 60 has an end pressing the plugs 40 and 50 and the other end pressing the lid 80, so that the pads 60, the plugs 40 and 50 and the lid 80 have a tight connection.

In conclusion, the ball valve of the present invention has the ball covered in the valve seat completely that enhances the leakage-proof capacity to prevent fluid from storing in the valve.

What is claimed is:

1. A ball valve, comprising:
   a valve seat having a chamber therein and bores communicated with the chamber;
   a ball, which has a plurality of channels, received in the chamber;
   a shaft connected to the ball;
   a plurality of lids connected to the valve seat to close the bores;
   a first plug and a second plug received in the chamber, each of which has a through hole and a concave portion fitting the ball to completely cover the ball therein when the first plug is combined with the second plug, a first recess, two second recesses at opposite sides of the first recess and two slots around the second recesses respectively, wherein the slots form two receiving slots when the first plug is combined with the second plug;
   two pads, each of which has a through hole, received in the receiving slots respectively to cover the ball, and
   wherein each of the pads has a slot at an end thereof around the through hole.

2. The ball valve as defined in claim 1, wherein the valve seat has three of the bores.

3. The ball valve 1 as defined in claim 2, wherein the number of the lids is three to close the bores respectively.

4. The ball valve as defined in claim 1, wherein the ball has three of the channels.

5. The ball valve as defined in claim 1, wherein the second plug has a lid to close the through hole.

6. The ball valve as defined in claim 1, wherein each of the pads has a flange between the slot and the through hole.

7. A ball valve, comprising:
   a valve seat hating a chamber therein and bores communicated with the chamber;
   a ball, which has a plurality of channels, received in the chamber;
   a shaft connected to the ball;
   a plurality of lids connected to the valve seat to close the bores;
   a first plug and a second plug received in the chamber, each of which has a through hole and a concave portion fitting the ball to completely cover the ball therein when the first plug is combined with the second plug, a first recess, two second recesses at opposite sides of the first recess and two slots around the second recesses respectively, wherein the slots form two receiving slots when the first plug is combined with the second plug;
   two pads, each of which has a through hole, received in the receiving slots respectively to cover the ball,
   wherein the valve seat has three of the bores;
   wherein the number of the lids is three to close the bores respectively, and
   wherein each of the lids has a connection portion at an end thereof and two of the lids have a neck portion respectively.

8. The ball valve as defined in claim 7, wherein each of the pads has a slot at an end thereof around the through hole.

9. The ball valve as defined in claim 7, wherein the neck portion has an annular step.

10. The ball valve as defined in claim 7, wherein the ball has three of the channels.

11. The ball valve as defined in claim 7, wherein the second plug has a lid to close the through hole.

12. The ball valve as defined in claim 7, wherein each of the pads has a flange between the slot and the through hole.

* * * * *